United States Patent [19]
Peters

[11] 3,836,256
[45] Sept. 17, 1974

[54] INTERFEROMETER FOR TESTING TELESCOPE OPTICS

[75] Inventor: William N. Peters, Ridgefield, Conn.

[73] Assignee: The Perkin-Elmer Corporation, Norwalk, Conn.

[22] Filed: May 8, 1972

[21] Appl. No.: 251,305

[52] U.S. Cl.............. 356/109, 356/111, 356/124, 356/113
[51] Int. Cl. ............................................. G01b 9/02
[58] Field of Search .......................... 356/106–113, 356/124

[56] References Cited
UNITED STATES PATENTS
3,567,324  3/1971  Brooks............................... 356/107
3,694,088  9/1972  Gallagher et al. .................. 356/106

*Primary Examiner*—David Schonberg
*Assistant Examiner*—Conrad Clark
*Attorney, Agent, or Firm*—John K. Conant

[57] ABSTRACT

This is an interferometer of Twyman-Green type adapted for testing the optics of a stellar telescope. Coherent light from a source, such as a star, through the telescope is collimated and divided into a reference beam, and a main beam, which are, respectively, a fractional cross-sectional area of the collimated beam, and the remaining cross-sectional area thereof. The reference beam is expanded to be the same diameter as the main beam by an afocal telescope and the two are then combined in superimposed relation. The optical path lengths of the reference and main beams are made approximately the same and means is provided for cyclically lengthening and shortening the length of one of them at a predetermined rate so that one of the paths is cyclically shorter than, equal to and longer than the other. The combined beams are filtered and focussed to image the telescope pupil (usually the primary mirror) in a plane, and at least a pair of photodetectors in this plane detect the light respectively at different points on the image, and produce signals proportional to the light received. The signals from the respective photodetectors are compared as to phase when the signal is sinusoidal, or time delay when the signal is a pulse, to detect the deviation of the wavefront exiting the telescope from the ideal wavefront, such deviation being linearly proportional to aberrations of the telescope resulting from poor optical figure on the individual optical elements or misalignment of the telescope optics.

9 Claims, 6 Drawing Figures

INTERFEROMETER FOR TESTING TELESCOPE OPTICS

ORIGIN OF INVENTION

The invention described herein was made in the performance of work under a NASA contract and is subject to the provisions of Section 305 of the National Aeronautics and Space Act of 1958, Public Law 85-568 [72 Stat. 435, 42 U.S.C. 2457].

BACKGROUND OF THE INVENTION

The present invention relates to interferometers of the Twyman-Green type for testing the optics of a telescope to detect aberrations in the telescope primary mirror, relay optics, or misalignment between the telescope optical components. In particular the invention is a simplified interferometric system which is much more practical for use with space borne telescopes than known interferometric systems which have been proposed for such use.

Interferometers of this invention are intended particularly for testing and alignment (including focus) of the optics of large space borne telescopes, in general. A special type of large orbiting telescope for which the interferometer has special application, is a telescope which has a deformable primary mirror and actuator elements for adjusting the configuration of its primary mirror surface when the telescope is in position in space. The optics, and particularly the primary mirrors of such a telescope, tend to become deformed due to induced mechanical and thermal stresses when they are launched into space. Therefore, in order to maximize the optical performance of such a telescope, its primary mirror is made controllably deformable so that the optical figure of the primary mirror can be selectively varied to eliminate the aberrations resulting from the deformation of the mirror. An interferometer is incorporated in the structure of the telescope immediately behind the prime focus for detecting aberrations. This information is processed in real time to generate an error signal which controls the mechanical and electrical linkages for operating actuator elements to make the corrections to the primary mirror indicated.

Heretofore laser illuminated Twyman-Green type interferometers have been utilized for this purpose. In these a laser beam is collimated and divided into two beams by a beamsplitter. One beam is focussed at the center of curvature of the primary mirror and thus illuminates the primary mirror while the other half is reflected to reference mirror. The primary mirror and reference mirror reflect the portion of the light they receive back to the beamsplitter so that these portions are thus recombined. The portion of light from the reference mirror provides a reference beam with which the light from the primary mirror interferes to provide a pattern of interference fringes which are detected by photodetectors. Signals from the photodetectors proportional to intensity of the viewed fringes are processed electronically and error signals are generated to control the actuator elements for adjusting various surface areas of the primary mirror surface to correct the detected aberrations. The structure and mountings of these laser interferometers and the power supplies they require increase substantially the bulk and weight of the telescope and contribute a large part of the problems and cost involved in putting telescopes in space.

BRIEF DESCRIPTION OF THE INVENTION

A principal object of the present invention is not only to provide an effective interferometer of the general type described for use in space borne telescopes, but to provide one that is considerably less bulky, lighter and more accurate than the laser interferometers previously used for this purpose.

Another object is to provide such an interferometer which, for the purpose described, is placed behind the primary mirror of the telescope, rather than in front as in the case of a laser interferometer, so as to reduce the length of the telescope.

A further object is to provide an interferometer which utilizes a stellar source of light rather than a laser beam so that its power requirements and complexity of operation are considerably reduced as compared with interferometers which use a laser beam or other artificially supplied point sources of light.

These and further objects are accomplished with the interferometer arrangement of the present invention wherein coherent light from a point source, which is suitably a star, is viewed through the telescope optical system to be tested. In the interferometer, a collimating lens, which is located one focal length behind the image plane of the telescope, collimates the light. Since the telescope primary mirror is optically far removed from the collimating lens, it forms an image of the telescope primary mirror approximately one focal length behind the collimating lens. A flat mirror, whose area is a small fraction of the cross-sectional area of the collimated beam, is supported at an angle in the latter beam to reflect a portion which provides a reference beam, the remaining portion of the original beam being referred to herein as the main beam. The reference beam and the main beam are directed along different paths — the legs of the interferometer — and subsequently recombined in superimposed relation after the reference beam has been expanded to have substantially the same cross-sectional area as the main beam. The reference beam is suitably expanded by an afocal telescope system and the expanded reference beam and the main beam are effectively recombined in superimposed relation bringing them together at a beamsplitter which transmits part of one to emerge through a surface from which part of the other is reflected. The path lengths of the reference beam and main beam are made approximately equal and means is provided in one of the paths, suitably the path of the reference beam, for cyclically varying the length of one path so that the length of this path is changed at a selected rate to be repetitively shorter than, equal to and longer than the other path, and vice versa. The means for thus varying one path length is provided by a retroreflector from which the reference beam is reflected and which is mounted for oscillatory movement on a piezoelectric pusher that is operated cyclically.

The combined beam from the beamsplitter is focussed in such a manner that the telescope primary mirror is focussed on photodetectors which measure the light intensity respectively at a reference point and at the other points in the focal plane.

The reference point is an arbitrarily chosen area which is a small point of the plane in which the pupil (usually the primary mirror) is imaged, the light at this point is considered as being a point with which all other points in the pupil plane, or at least a significant sampling of other points, are compared. While the reference point itself may in fact be deformed, by using it as a basis and by measuring other points with reference to it, a substantially error-free optical path difference map of the primary mirror is achieved.

In principle, deformations in the telescope optics and/or misalignment perturbate the wavefronts of light which are transmitted through the optics. These deformations and/or misalignments generate phase-time changes in the portions of the wavefronts proceeding from the cross-sectional portions of the optics at which the aberrations and/or misalignment occur. In the interferometer of this invention, a small reference area of the wavefront is combined with the remaining portion of the wavefront and then the phase of a number of different points over the area of a wavefront arriving at the pupil plane of the system are compared with the phase of the wavefront at an arbitrarily selected reference point in the pupil plane, or the times of arrival of a wavefront at the respective points are compared.

The comparison is made by comparing the signals from a reference photodetector at the reference point in the pupil plane with the signals from another photodetector placed successively at other different points in the pupil plane — or with separately considered signals from a plurality of photodetectors arranged in an array covering selected key areas of the pupil plane — as the length of one of the beam paths, preferably the path of the reference beam, is varied cyclically to be shorter than, equal to and longer than the path of the main beam. This cyclic variation of the relative lengths of the beam paths facilitates the detection and accurate measurement of phase, or time differences; comparable detection and measurements could be carried out without such cyclic variation by measuring relative light intensity at the respective points, but this latter method would not be as accurate and has resultant ambiguities.

Differences in the phase or time of points in the wavefront at the interrogated points from the phase or time of the wavefront detected at the reference point, which is arbitrarily taken as representing the basis, are linearly proportional to the phase aberration resulting from the figure error at corresponding points on the surface of the primary mirror; and such deviations are detected and measured by noting either a difference in phase or time delay between the signals from the reference photodetectors and from a photodetector at another point in the pupil plane. Since the length of one of the beam paths is varied at a predetermined rate, linear measurement of the aberration of a point on the wavefront exiting the telescope is readily calculated from the foregoing time measurement. When the magnitude of the wavefront aberration is thus detected and measured, the information may be applied in any suitable manner to correct the system, by changing the contour of the primary mirror, or the alignment of the secondary mirror (including focus) of the system as required to eliminate the aberration producing defect. In the type of space borne telescope that has a controllably deformable primary mirror, the error information may be used to generate an error signal which controls the actuator devices for making the requisite corrections to the primary mirror.

DESCRIPTION OF THE DRAWINGS

The invention will now be described in detail with reference to the illustrative embodiments shown in the accompanying drawings, in which:

Referring to FIG. 1 of the drawings, an interferometer 10 in accordance with this invention is adapted to be used for testing the optics of a telescope 11 which as shown is a reflecting Cassegrainian telescope having a concave primary mirror 12, a convex secondary mirror 13 and a field stop 14 in the focal plane of the telescope. The interferometer 10 of this invention is adapted to detect and measure figure errors in the primary mirror 12 and to detect misalignment of the primary and secondary mirrors 12 and 13.

Figure 1:
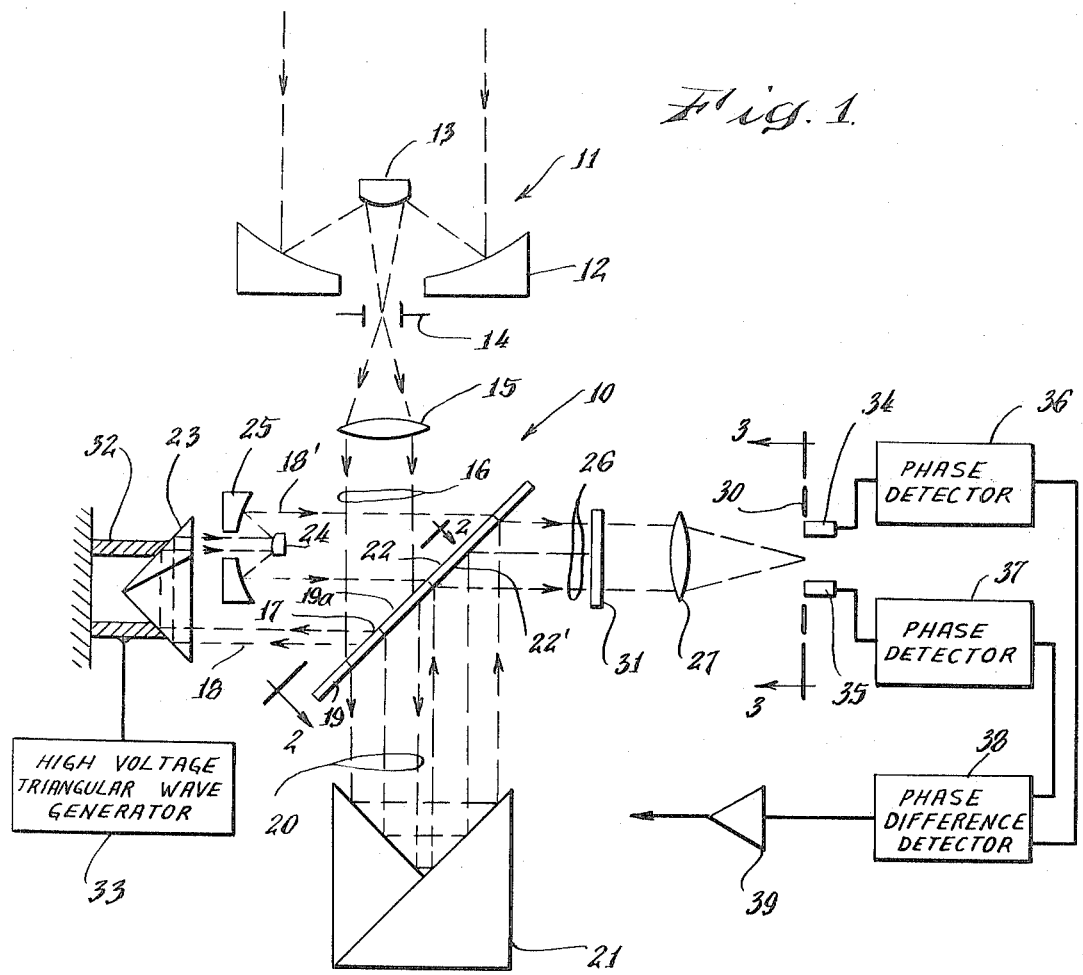
FIG. 1 is a diagrammatic representation of an interferometer of this invention shown in combination with a telescope for testing the optics of the telescope.

In accordance with the invention the interferometer 10 is adapted to test the optics of the telescope 11 using a source of suitable coherent light viewed through the telescope. The source may be a laser, a star, or any other source of at least partially coherent light, however, the interferometer of this invention is particularly adapted for use in combination with space borne telescopes and for using the light from a distant star viewed by the telescope. A stellar source, such as the star Canopus, provides a perfect spatially and temporally coherent source for the interferometry. For telescopes on the earth's surface, a stellar source is not particularly suitable due to the loss of coherence resulting from atmospheric turbulence resulting when the light passes through the earth's pertubing atmosphere.

In the drawing, the interferometer 10 is shown much larger in relation to the sizes of telescope mirrors 12 and 13 than is actually the case, for the purpose of convenience. Also, the telescope can be of a design utilizing refractive elements or utilizing the so called off-axis telescope designs.

As shown, the interferometer 10 is located behind the telescope's primary mirror 12 and includes a collimating lens 15 for collimating the starlight from the vicinity of the field stop 14 into a beam 16. The collimating lens 15 is one focal length behind the image plane of the telescope and forms an image of the telescope primary mirror approximately one focal length behind the collimating lens.

A mirror or reflective dot 17 of much smaller diameter than the collimated beam 16 is interposed in an area of the beam 16 in which the primary mirror 12 is imaged and is placed in the beam at an angle for separating out a portion of the beam to provide a reference beam 18.

Figure 2:
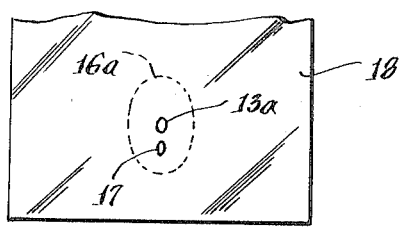
FIG. 2 is a view along the lines 2—2 of FIG. 1.

The reflective dot 17 is suitably supported by being mounted on a clear glass plate 19 which is mounted to intersect the collimated beam 16 at a non-normal angle, for example 45°, as shown. FIG. 2 is a plan view of the clear glass plate 19 showing the reflective dot 17 mounted thereon. The position of the reflective dot 17 is not critical except that is must, of course, be within the circumference of the collimated beam, indicated in dash line 16a, impinging on the plate and outside the central obscuration of the beam, indicated in dash line 13a, which is the shadow of the telescope secondary mirror 13.

The portion of the collimated beam from the lens 15 that remains after the reference beam 18 is separated therefrom passes through the clear glass portion 19a of a glass plate 19 to provide what is referred to hereafter as a main beam 20. The clear glass 19a is provided with an antireflection coating so that substantially all the light of the collimated beam from lens 15 that is not separated out into the reference beam 18 will pass through. A Porro prism 21 in the path of the main beam 20 from the clear glass 19a both laterally displaces and reverses the direction of the main beam 20 back to a beamsplitter 22 which is at a non-normal angle to the path of the main beam 20 from the Porro prism 21. As shown, the beamsplitter 22 is suitably provided by a semireflective coating 22' on one end portion of the glass plate 19, the other end portion being the clear glass portion 19a. Having the clear glass 19a and the beamsplitter 22 parts of a single plate 19 with minimum wedge simplifies the structure and simplifies making the total optical path lengths and the path length in glass of the reference beam 18, 18' (18' being described in detail below) and main beam 20 effectively equal. It is important that these optical path lengths through glass be equal since unequal path lengths cause dispersion in the interferometer output which reduces the fringe contrast and the overall accuracy and sensitivity of the interferometer. The portions of the path lengths which pass through glass are thus made equal by having the clear glass portion 19a and the beamsplitter 22 parts of a single glass plate 19 so as to be at the same angle to the beams and beam portions reflected from them and passing through them, and in addition, by having the reflective dot 17 on the surface of the clear glass portion 19a on which the collimated beam 16 impinges, and by having the semireflective coating 22', which forms beamsplitter 22, on the under surface of the plate 19 on which the portion of the main beam 20 from the Porro prism 21 impinges.

From the reflective dot 17 the reference beam 18 is laterally displaced and has its direction reversed by means of a corner cube 23 from which the reference beam 18 is directed through an afocal telescope consisting of a parabolic convex mirror 24 and a concave parabolic mirror 25 which enlarges the reference beam to have substantially the same diameter as the main beam 20. The enlarged reference beam is designated 18'. The telescope combination of mirrors 24 and 25 recollimates the reference beam and directs the enlarged reference beam 18' to impinge on the opposite side of the beamsplitter 22 from the main beam 19 and at a non-normal angle to the beamsplitter. Both the main beam 20 and the enlarged reference beam 18' are thus caused to impinge on the beamsplitter 22 at complementary angles, and at opposite sides of the same area, so that the transmitted portion of the expanded reference beam 18' is superimposed on the reflected portion of the main beam 20 which will thus proceed in the same direction in the form of a combined beam designated 26. It is desirable to have the intensity of the portion of the expanded reference beam 18', which is transmitted through the beamsplitter 22, a calculatable fraction of the intensity of the portion of the main beam 20 reflected therefrom, so that the reference and main components of the combined beam 26 will be interferometrically combined in such a manner as to maximize the signal to shot noise ratio. For this purpose the beamsplitter 22 is a beamsplitter having an optical transmission characteristic defined by the expression: $1 - d/D$, where $d$ is the diameter of the unexpanded reference beam as formed by the mirror 17 and D is the diameter of the main beam 20.

Figure 4:
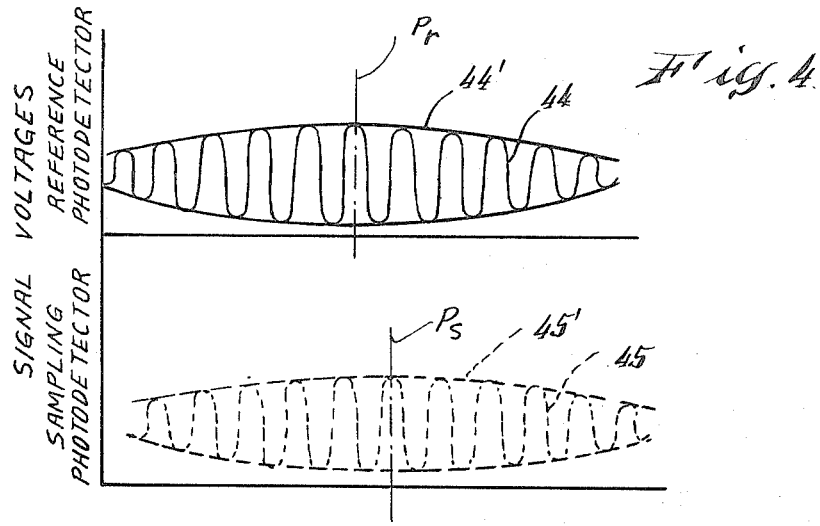
FIG. 4 is a representation of an oscilloscopic trace of electric signals from the two photodetectors that are utilized for transforming the optical output of the interferometer of FIG. 1 into representative electric signals when the optical bandwidth of the system is much less than the center wavelength.
Figure 5:
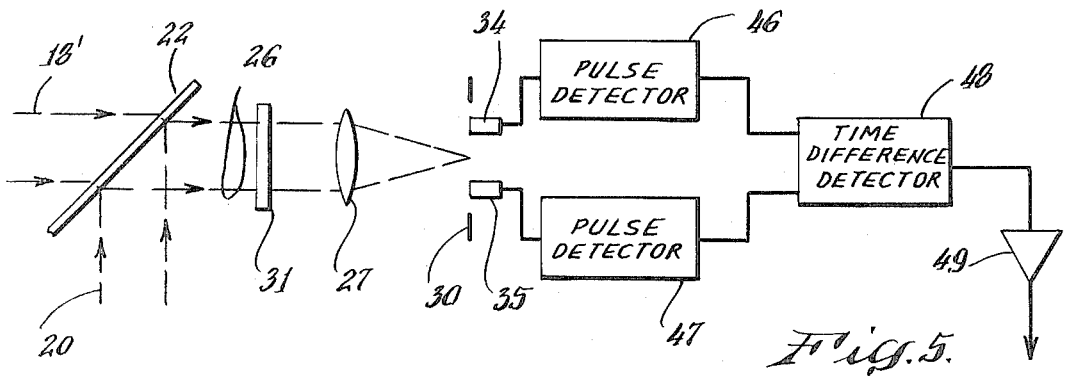
FIG. 5 is a partial diagrammatic representation of the optical portion of the interferometer of FIG. 1 but showing alternative signal processing electronics associated therewith for the case when the optical bandwidth of the system is on the fractional order of the center wavelength.
Figure 6:
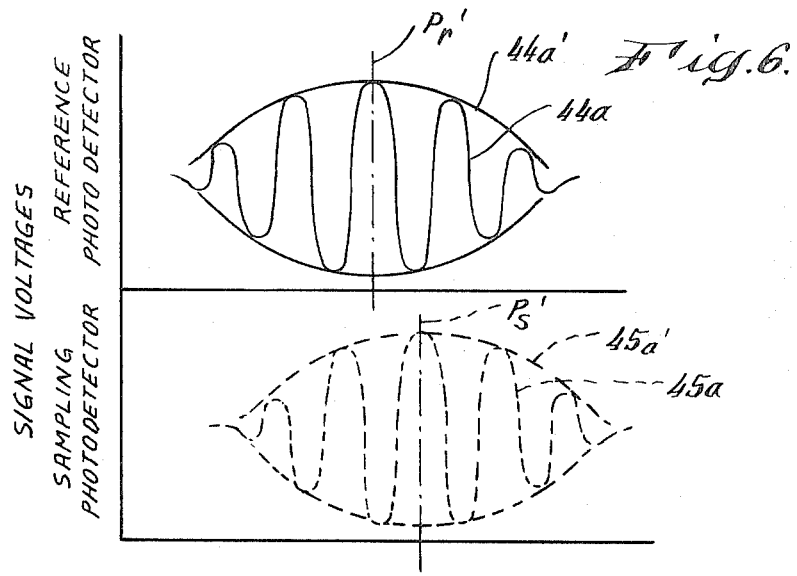
FIG. 6 is a representation of an oscilloscopic trace of output signals from the photodetectors shown in the FIG. 5 embodiment.

The combined beam 26 from the beamsplitter 22 is focussed by a lens 27 to form an image of the primary mirror 12, which usually defines the pupil of the telescope, in a relay pupil plane 30. A filter 31 is preferably placed in the beam between the beamsplitter 22 and the lens 27 as a method of generating a desired spectral bandwidth of the particular optical signals used in the interferometry. For using the interferometer 10 as a phase measuring interferometer, in the manner illustrated in FIGS. 1 and 4, the filter 31 will be a narrow spectral filter; when it is to be used as a pulse measuring interferometer, as illustrated in FIGS. 5 and 6, the filter 31 will be a wide spectral filter, or alternatively, the filter 31 could be omitted entirely.

In order to produce an interference pattern in the pupil plane 30, the paths of the reference beam 18, 18' from the mirror 17 to the beamsplitter 22, and of the main beam 20 from the clear glass portion 19a to the beamsplitter 22, are made approximately equal and one, the path of the reference beam, is varied in an oscillatory mode at a predetermined constant rate to be repetitively shorter than, equal to and longer than the path of the main beam. This is suitably accomplished as shown by having the corner cube 23 mounted on a piezoelectric pusher 32 which is driven by a high voltage triangular wave generator 33. When a stellar source is used, the corner cube 23 is preferably an open trihedral cube corner, also known as a hollow cube corner.

Figure 3:
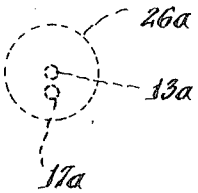
FIG. 3 is a view along the lines 3—3 of FIG. 1.

The optical signals temporally encoded in the primary mirror image in pupil 30 are transformed into electrical signals for processing by a reference photodetector 34 fixed in one position in the plane and by another, sampling, photodetector 35 at another location in the plane. The photodetectors are suitably photomultipliers which produce amplified electrical signals proportional to the intensity of light received. The photodetectors will, of course, be positioned to receive light from the image and thus will be placed within the circumference of the pupil, indicated in dash line 26a in FIG. 3, and outside the shadows of the telescope secondary mirror 13 and mirror 18, indicated in dash lines respectively at 13a and 17a in FIG. 3.

The location of the reference photodetector 34 in the image plane 30 is not critical but it remains fixed at one location that is taken as the reference point, which means that the optical signals detected at that point are taken as a basis against which all other measurements are performed. The other photodetector 35 is placed successively at other points in the pupil plane 30 for comparing the optical signals representing other points in wavefronts actually received at these other points in the pupil plane with the reference signals in order to detect and measure differences between the actual wavefronts and basis wavefronts at these other points. A single sampling photodetector 35 may be moved over the pupil plane 30 for sampling the other areas, or, alternatively, a plurality of other sampling photodetectors 35 could be permanently mounted in an array for detecting the optical signals at a number of other locations simultaneously. In either case, the output of the reference photodetector 34 is separately compared with the output of a sampling photodetector 35 at each other location. Hereafter suitable techniques and equipment for carrying out the comparison will be described with reference to the reference photodetector 34 and one sampling photodetector 35 at a single other location. In practice, a preferred arrangement includes an array of sampling photodetectors 35 at various selected locations in the pupil plane 30 with connections and equipment for comparing the output of the reference photodetectors sequentially with the outputs of the sampling photodetectors.

FIG. 1 illustrating the interferometer 10 utilized as a phase measuring interferometer. In this case the filter 31 is a narrow band spectral filter limiting the light appearing at the pupil plane 30 to light in a narrow band of wavelengths, e.g., from 0.48 $\mu$m to 0.52 $\mu$m, in order to improve the detection of phase. The outputs of the reference photodetectors 34 and the sampling photodetector 35 are fed to phase detectors 36 and 37 respectively. As illustrated in FIG. 4, as the path length of the reference beam 18, 18' oscillates (being sequentially shorter than, equal to and longer than the length of the path of the main beam 21), the voltages of the signals from each of the photodetectors 34 and 35 are similar sinusoids 44 and 45 (shown in full and dash lines respectively) which have symmetrical envelopes 44' and 45' (similarly in full and dash lines). The sinusoids 44 and 45, and their envelopes 44' and 45', have maximums, identified respectively by the dash lines $P_r$ and $P_s$, which are the points of maximum constructive interference at the locations of the reference and sampling photodetectors 34 and 35 in the pupil plane 30. If there is no telescope figure error or misalignment effecting the ray line in the main beam 20 which interferes with the reference beam 18, 18' at one of the photodetectors 34 or 35, the point of maximum constructive interference will then occur when the path lengths of the reference and main beams are equal; but if there is a figure error or misalignment affecting that ray line in the main beam, the phase of the signals from the photodetector involved shifts the point $P_r$ or $P_s$ of maximum constructive interference to a point at which the wavefront distortion effecting that ray line of the main beam is balanced by the reference beam path length being relatively shorter or longer than the main beam path length.

FIG. 4 illustrates the condition in which the point $P_s$ of maximum constructive interference at the point in the pupil plane 30 sampled by the sampling photodetector 35 is shifted to the right relative to the maximum point $P_r$ established by the reference detector 34. This shift indicates a distorted wavefront and hence a figure error or misalignment effecting a point on the telescope primary mirror corresponding to the point in the pupil plane sampled by sampling photodetector 35, in relation to the standard for an ideal wavefront from a correctly aligned telescope optical system free of figure errors as established by optical signals received at the reference photodetector 34. If the maxima at $P_r$ and $P_s$ coincide, this indicates that the point sampled by the sampling photodetector 35 is free of figure error and misalignment relative to the standard, and the signals from the reference and sampling photodetectors will be in phase.

In the FIG. 1 an arrangement, when the maxima at $P_r$ and $P_s$ do not coincide, indicating a figure error or misalignment at the point sampled, the error and misalignment are detected and measured by detecting and measuring the resultant difference in phase between the signals which are fed to the phase detectors 36 and 37 from the reference and sampling photodetectors 34 and 35.

The phase detectors 36 and 37 produce output signals which are linearly related to the phase of the signals from the photodetectors 34 and 35. These output signals from the phase detectors are then fed to a phase difference detector 38 which in turn produces output signals proportional to the difference in phase between the signals generated by the reference photodetector 34 and the sampling photodetector 35. This difference in phase is linearly related to the amount of deviation of the actual wavefront portion generated by the surface portion of the telescope primary mirror 12 corresponding to the position of the sampling photodetector 35 in the pupil plane 30 from the assumed ideal wavefront basis established by the reference point of the image plane 30. This difference in phase is translated into a distance measurement by feeding the phase difference signal from the difference detector 38 to an amplifier 39 that has a gain which properly scales the voltage output of the difference detector to a desired scale of measurement. The voltage output from amplifier 39 may be appropriately scaled to be applied to actuate control elements for correcting figure errors in a telescope having a deformable primary mirror, to be fed into data processing apparatus, or to be reproduced in magnetic or printed form, for example.

The sampling photodetector 35 is moved to a selected number of different points in the pupil plane 30 (or an array of sampling photodetectors 35 is provided to sample the various points), and the output signals at each location are compared to the signals from the reference photodetector 34. The separate comparisons may be plotted or otherwise permanently or temporarily stored to provide a map of any differences between points in the actual wavefront from the telescope optical system and an ideal wavefront which would be produced if the system were in correct alignment and free of figure errors. With such a map, figure errors and misalignment may be discriminated by comparing the field symmetry of wavefront distortions measured at the various different points.

FIGS. 5 and 6 illustrate an alternative arrangement in which distortions in an actual wavefront, sampled by a sampling photodetector 35 (or an array) in the pupil plane 30, in comparison with an ideal wavefront basis established by the reference photodetector 34 are detected and measured with reference to time delay rather than by the phase comparison illustrated by FIGS. 1 and 4. In this arrangement, the filter 31 is a wide bandwidth filter, or is eliminated entirely. Increasing the bandwidth of the optical signals detected in the pupil plane 30 greatly increases the amplitudes of the peaks of the sinusoidal waves 44a and 45a of the voltage signals respectively from the reference and sampling photodetectors 34 and 35 at maximum constructive interference in the optical signals received by the respective photodetectors in comparison with peaks on either side of maximum constructive interference, so that the respective wave envelopes 44a' and 45a' are contracted and bulged in the center as shown in FIG. 6. The maximum of the voltage signals produced by maximum constructive interference in the optical signal detected by the reference photodetector 34 is indicated by vertical dash line $P'_r$; the similar maximum peak of signals from sampling photodetector 35 is indicated by dash line $P'_s$. In FIG. 6 the $P'_s$ peak is shown spaced to the right of the $P'_r$ peak indicating a deformation at the point in an actual wavefront sampled by sampling photodetectors 35 in comparison with an ideal or standard wavefront established by the wavefront portion sampled by the reference photodetector 34.

In the FIG. 5 arrangement the output signals from the reference and sampling photodetectors are fed respectively to pulse detectors 46 and 47, which are sensitive to the amplitude of wave pulses received and which produce output signals only in response to signals at the peaks $P'_r$ and $P'_s$. The output signals from the pulse detectors 46 and 47 feed to a time difference detector 48 which generates a voltage linearly related to the time difference between the outputs of the pulse detectors. This voltage from the time difference detector 48 is thus linearly related to the aberration in an actual wavefront portion sampled by sampling photodetector 35 with respect to an ideal wavefront basis established by the wavefront portion sampled by the reference photodetector 34. The time difference represented by the time difference detector output is translated into a distance measurement by feeding the output to an amplifier 49 which has a gain selected to scale the output to a desired scale of measurement. Successive readings are taken with the sampling photodetector 35 moved around to various different locations in the pupil plane 30 (or by using an array of sampling photodetectors 35), and, as explained with reference to the FIG. 1 arrangement, the appropriately scaled amplifier output may be applied in a number of ways; it may be recorded, used in data processing or utilized to automatically correct figure errors in a telescope which has a deformable primary mirror.

As previously noted, the interferometer of this invention is particularly suited for utilizing a stellar source as the coherent light source. However, it will be appreciated that this interferometer may also, with minimal modification, be utilized for testing optical systems which have an internal coherent optical source such as a laser. A typical example of such a system is the transmitter for laser radar or laser communication applications. The aperture of primary mirror 12 (or equivalent collimator optics) is made equal to or greater than the aperture of the system under test. The optical system under test then illuminates the interferometer in the same manner as the star light in the previously discussion and a map of the wavefront transmitted by the optical system under test is then obtained. This technique has the advantage that the system under test is being used in a mode identical to that in which it is used in practice, i.e., any errors in the laser output, relay optics, or any other critical element in the system will be faithfully displayed by this invention. Also, the interferometer of this invention, when used in this operational mode, does not require an independent coherent reference source for the required interferometry.

What is claimed is:

1. An interferometer for testing the optics of a telescope for alignment and aberrations, comprising means selecting the light from a single source of at least partially coherent light viewed through a telescope, means collimating said light into a beam, a first transparent plate at an angle across the collimated beam at the pupil of the telescope with a reflective dot on the surface of the plate on which the collimated beam impinges, said dot being within the circumference of the beam area and a fraction of the cross-sectional area of the collimated beam, so that the collimated beam is separated into a reference beam consisting of a fractional cross-sectional area of the collimated beam reflected by the dot and a main beam consisting of the remaining cross-sectional portion of the collimated beam passing through the transparent plate, means directing the reference and main beams along separate paths to combining means from which the beams emerge in superimposed relation, means expanding the reference beam to be substantially the same diameter as the main beam at the combining means, means for changing the length of one of said separate paths of the reference and main beams for making said paths alternatively unequal and substantially equal, means focussing the superimposed beams, and means detecting and comparing the interferometrically produced light at one selected area in the telescope relay pupil plane of the focussing means with the light in another area thereof.

2. The combination of claim 1 including means comparing the phase of the interferometrically produced light in one of said areas of said telescope relay pupil plane of the focussing means with the phase of the interferometrically produced light in another area thereof and including means producing a signal linearly proportional to a difference in phase.

3. The combination of claim 1 including means detecting the peak intensity of light in each of said areas of said relay pupil plane, and means producing a signal linearly proportional to a difference in time between a peak intensity of light in one of the areas and a peak intensity of light in the other.

4. The combination of claim 1 in which said means for changing the length of one of said paths changes the length between being shorter than, equal to, and longer than the other, cyclically at a uniform rate.

5. The combination of claim 1 in which said means separating the beam into two beams comprises a plane reflecting surface of smaller diameter than said collimated beam supported in the collimated beam to reflect a portion thereof away at an angle.

6. The combination of claim 1 in which said combining means comprises a beamsplitter, the paths of the reference beam and main beam being directed to the beamsplitter for one of the beams to be partially transmitted therethrough and the other beam to be partially reflected thereby, and for said partially transmitted and partially reflected portions to leave the beamsplitter in the same direction in superimposed relation.

7. The combination of claim 6 in which, for optimizing the performance of the interferometer, the beamsplitter is adapted to transmit that portion of the light incident thereon which is $1 - d/D$ times the amount of incident light, where $d$ is the diameter of the reference beam before expansion and $D$ is the diameter of the main beam.

8. The combination of claim 1 in which said combining means comprises a second transparent plate having a semireflective beamsplitting coating thereon, said second plate and said means for directing the main and reference beams being positioned for the main beam to impinge on the surface of the second plate having said coating thereon and for the expanded reference beam to impinge on the opposite surface so as to pass through the second plate and emerge in superposed relation with the portion of the reference beam reflected from the semireflected coating whereby the main beam passes through only the first plate and the reference beam passes through only the second plate, the first and second plates having substantially the same dispersion and thickness and being at substantially the same angle to the collimated beam and the reference beam respectively, whereby the optical path lengths of the main and reference beams through the respective plates are substantially equal.

9. The combination of claim 8 in which the first and second plates are different portions of a single transparent plate, the reflective dot being on one portion and the semireflective coating being on the other.

* * * * *